US011190117B2

(12) United States Patent
Krah (10) Patent No.: US 11,190,117 B2
(45) Date of Patent: Nov. 30, 2021

(54) APPARATUS AND METHOD FOR STORING ENERGY

(71) Applicant: BECKHOFF AUTOMATION GMBH, Verl (DE)

(72) Inventor: Jens Onno Krah, Wuppertal (DE)

(73) Assignee: Beckhoff Automation GmbH, Verl (DE)

( * ) Notice: Subject to any disclaimer, the term of this patent is extended or adjusted under 35 U.S.C. 154(b) by 176 days.

(21) Appl. No.: 15/479,933

(22) Filed: Apr. 5, 2017

(65) Prior Publication Data

US 2017/0310252 A1 Oct. 26, 2017

(30) Foreign Application Priority Data

Apr. 21, 2016 (DE) .................. 10 2016 107 419.5

(51) Int. Cl.
| | |
|---|---|
| *H02P 6/14* | (2016.01) |
| *H02M 5/458* | (2006.01) |
| *H02P 27/06* | (2006.01) |
| *H02J 7/34* | (2006.01) |
| *H02M 3/157* | (2006.01) |
| *H02M 1/32* | (2007.01) |

(52) U.S. Cl.
CPC .............. *H02P 6/14* (2013.01); *H02J 7/345* (2013.01); *H02M 3/157* (2013.01); *H02M 5/458* (2013.01); *H02P 27/06* (2013.01); *H02M 1/327* (2021.05)

(58) Field of Classification Search
CPC .................................. H02P 6/14; H02M 3/157
USPC ....................................................... 318/400
See application file for complete search history.

(56) References Cited

U.S. PATENT DOCUMENTS

| | | | | |
|---|---|---|---|---|
| 5,188,465 A | * | 2/1993 | Johnson | B41J 2/30 |
| | | | | 101/93.29 |
| 7,800,331 B2 | * | 9/2010 | Chakrabarti | H02P 27/08 |
| | | | | 318/440 |
| 8,058,830 B2 | * | 11/2011 | John | B60L 58/20 |
| | | | | 318/440 |
| 8,737,940 B1 | * | 5/2014 | Langer | H03F 3/189 |
| | | | | 455/127.1 |
| 2001/0017236 A1 | * | 8/2001 | Tominaga | B66B 1/30 |
| | | | | 187/290 |
| 2005/0141194 A1 | * | 6/2005 | Kamath | H01L 23/4275 |
| | | | | 361/696 |

(Continued)

FOREIGN PATENT DOCUMENTS

| | | |
|---|---|---|
| DE | 102009002202 A1 | 10/2010 |
| DE | 102011050719 A1 | 12/2012 |

(Continued)

*Primary Examiner* — Muhammad S Islam
*Assistant Examiner* — Devon A Joseph
(74) *Attorney, Agent, or Firm* — Dorsey & Whitney LLP (57) ABSTRACT

An apparatus for storing energy comprises a two-quadrant chopper connectable to a converter DC link, at least one energy store, connected to the two-quadrant chopper for storing energy, so that the two-quadrant chopper can be used to transport energy from the converter DC link to the at least one energy store or vice versa. The apparatus further comprises a control device for controlling a current flowing in accordance with the transport of the energy, wherein the control device is configured to control the current flowing in accordance with the transport on the basis of a thermal load on the at least one energy store.

22 Claims, 7 Drawing Sheets

(56) References Cited

U.S. PATENT DOCUMENTS

| | | | | | |
|---|---|---|---|---|---|
| 2005/0152146 | A1* | 7/2005 | Owen | ............... | H05B 47/10 |
| | | | | | 362/294 |
| 2007/0157035 | A1* | 7/2007 | Gumma | ............... | G06F 1/3225 |
| | | | | | 713/300 |
| 2007/0168151 | A1* | 7/2007 | Kernahan | ............... | G01K 7/425 |
| | | | | | 702/132 |
| 2009/0027056 | A1* | 1/2009 | Huang | ............... | B60L 58/12 |
| | | | | | 324/439 |
| 2009/0033255 | A1* | 2/2009 | John | ............... | B60L 58/20 |
| | | | | | 318/139 |
| 2009/0134828 | A1* | 5/2009 | Chakrabarti | ............... | H02P 27/08 |
| | | | | | 318/440 |
| 2011/0048823 | A1* | 3/2011 | Connolly | ............... | B60K 6/48 |
| | | | | | 180/65.29 |
| 2012/0091971 | A1* | 4/2012 | Syed | ............... | H01M 10/48 |
| | | | | | 320/162 |
| 2014/0039710 | A1* | 2/2014 | Carter | ............... | H02J 15/00 |
| | | | | | 700/291 |
| 2014/0210389 | A1* | 7/2014 | Niwa | ............... | H02P 3/12 |
| | | | | | 318/400.3 |
| 2014/0297238 | A1* | 10/2014 | Parthasarathy | ............... | G06F 30/13 |
| | | | | | 703/2 |
| 2016/0066386 | A1* | 3/2016 | Catalano | ............... | H05B 45/50 |
| | | | | | 315/309 |
| 2017/0123014 | A1* | 5/2017 | Goetz | ............... | G01R 31/40 |
| 2017/0220022 | A1* | 8/2017 | Hankendi | ............... | G06F 1/20 |

FOREIGN PATENT DOCUMENTS

| | | | |
|---|---|---|---|
| DE | 102013009823 | A1 | 12/2014 |
| EP | 2372892 | B1 | 3/2013 |

* cited by examiner

APPARATUS AND METHOD FOR STORING ENERGY

CROSS-REFERENCE TO RELATED APPLICATION

This application claims priority to German patent application DE 10 2016 107 419.5, filed Apr. 21, 2016, entitled KONZEPT ZUM SPEICHERN VON ENERGIE, which is hereby incorporated by reference in the entirety and for all purposes.

FIELD

This invention relates to an apparatus for storing energy. The invention further relates to a method for storing energy. The invention furthermore relates to a drive system.

BACKGROUND

DE 10 2013 009 823 A1 shows an electrical drive system and an energy storage apparatus therefor. EP 2 372 892 B1 shows an apparatus and a method for buffer-storing electric braking power from a motor operated using an inverter. DE 10 2009 002 202 A1 shows a circuit and a method for the uninterruptible supply of power to electronic assemblies. DE 10 2011 050 719 A1 shows a three-phase motor drive circuit capable of emergency operation.

SUMMARY

This disclosure provides an approach to efficiently storing energy.

EXAMPLES

One aspect of the disclosure provides an apparatus for storing energy, comprising:
  a two-quadrant chopper connectable to a converter DC link,
  at least one energy store, connected to the two-quadrant chopper, for storing energy,
  so that the two-quadrant chopper can be used to transport energy from the converter DC link to the at least one energy store or vice versa,
  a control device for controlling a current flowing in accordance with the transport of the energy,
  wherein the control device is configured to control the current flowing in accordance with the transport on the basis of a thermal load on the at least one energy store.
A further aspect provides a drive system, comprising:
  an electric motor that is connected to a converter having a converter DC link, and
  the apparatus for storing energy, wherein the two-quadrant chopper is connected to the converter DC link of the converter.
A further aspect provides a method for storing energy using the apparatus for storing energy, wherein the two-quadrant chopper is connected to a converter DC link, comprising the following steps:
  transporting energy from the converter DC link to the at least one energy store or vice versa by the two-quadrant chopper, so that a current flows in accordance with the transport of the energy, and
  controlling the current flowing in accordance with the transport of the energy by the control device on the basis of a thermal load on the at least one energy store.

A thermal load on the at least one energy store is used for controlling the current flowing in accordance with the transport of the energy. The thermal load on an energy store is dependent, inter alia, on an amount of energy transported to the energy store that is intended to be stored in the energy store. Since the transport of energy is consistent with a current flowing in the present case, control of the current flowing can be used to efficiently adjust or control a quantity of energy that is stored in the energy store. As a result, a thermal overload can advantageously be avoided, for example, that could lead to the energy store being damaged, for example.

Further, this allows a level of cooling complexity for the at least one energy store to be reduced. This achieves the technical advantage, in particular, that an approach to efficiently storing energy is provided.

Thermal load, particularly in drive engineering, that is to say particularly in an energy store for or rather of a drive system, is based particularly on the product of I, the current flowing, squared and T, a time interval or rather a time integral: $I^2 \ast T$. T is dependent particularly on the associated thermal time constant of the energy store. The thermal time constant is obtained from a power dissipation P and a thermal mass of the energy store.

For a nonreactive resistor, it holds that:

$$P = I^2 \cdot R$$

or $$E = I^2 \cdot RT;$$

$$E/R = I^2 \cdot T.$$

E denotes an energy resulting from the power dissipation P and the time T.

The thermal load can be indicated as a percentage of a maximum thermal load, for example. A 100% thermal load is then consistent with the maximum permissible thermal load.

The 100% maximum thermal load is obtained from a rated current $I_0$ (squared $I_0^2$). An instantaneous current flowing is squared in a model (this model is the model described below, for example) and filtered using the thermal time constant of the energy store (for example by a first-order low-pass filter), for example. The accordingly filtered signal or rather the result of this filtering is the instantaneous $I^2T$ value. This instantaneous $I^2T$ value divided by $I_0^2$ yields the thermal load in %. A 100% thermal load means that the rms value of the current averaged over time corresponds to the rated current $I_0$ or rather produces the same heating.

Such a model has the advantage that the heating can be estimated without the time delay of a temperature sensor. Such $I^2T$ models have been used for years to protect the winding in electric motors and are therefore known to a person skilled in the art.

In the case of electrical appliances, particularly in the case of an electric motor, the rated current is an electric current drawn when the appliance, particularly the electric motor, is supplied with the rated voltage, and is the rated power of said appliance. An electric motor draws the rated current only when full mechanical power is delivered.

The wording "at least one energy store" particularly covers the wording "multiple energy stores." In so far as the text above or below refers merely to "an energy store," the term "at least" is meant to be inferred, so that statements made in connection with an energy store apply analogously to multiple energy stores and vice versa.

Where there are multiple energy stores, these may be in identical or different form, for example.

A transport of energy comprises particularly a transport from the converter DC link to the energy store. The current flowing in accordance with this transport thus flows from the converter DC link to the energy store. The energy store is thus charged. The current flowing from the converter DC link to the energy store can therefore also be referred to as a charging current.

A transport of energy comprises particularly a transport from the energy store to the converter DC link. The current flowing in accordance with this transport thus flows from the energy store to the converter DC link. The energy store is thus discharged. The current flowing from the energy store to the converter DC link can therefore also be referred to as a discharge current.

A current within the context of this description is an electric current. In one embodiment, the converter DC link comprises a capacitor that can be referred to particularly as a DC link capacitor. This achieves the technical advantage, for example, that a converter DC link voltage can be efficiently smoothed and stabilized.

A two-quadrant chopper within the context of this description comprises particularly two DC choppers, particularly a step-up converter and a step-down converter.

A two-quadrant chopper particularly comprises one or more LC resonant circuits in which energy needed for a voltage conversion can be buffer-stored. By way of example, the two DC choppers each comprise an LC resonant circuit. A capacitor of an LC resonant circuit is in the form of a supercapacitor, particularly in the form of a SuperCap, according to one embodiment. The capacitor in particular advantageously smooths an output voltage from the two-quadrant chopper. The inductance, that is to say the coil, in particular advantageously smooths the current flowing.

In one embodiment, the control device is configured to reduce and/or interrupt a current flowing from the converter DC link to the at least one energy store or vice versa in the event of the thermal load exceeding a predetermined first load threshold value.

This achieves, for example, that a thermal overload on the energy store can be efficiently prevented. The reason is that a reduction in the current also involves only an accordingly reduced quantity of energy being stored in the energy store or rather taken from the latter, meaning that the thermal load corresponding to this taking or rather storage can be reduced accordingly. In the event of an interruption, there is even no further energy at all taken or rather stored, which means that this also cannot result in a thermal load.

That is to say, for example, that in one embodiment, no further energy is stored in the energy store upward of a predetermined thermal load, for example 80%, in this case stipulated by the first load threshold value. The functionality of the energy store as storage of the energy produced by the electric motor operated in a generator mode (that is to say during braking) is therefore switched off. Nevertheless, the energy store can still be used as an emergency power supply by making the energy stored in the energy store available in the electric motor when required.

According to a further embodiment, the control device is configured to reduce an energy storable in the at least one energy store in the event of the thermal load exceeding a predetermined second load threshold value. This achieves, for example, that a further thermal load can be efficiently avoided or reduced.

Reduction of the energy storable in the at least one energy store is caused, according to one embodiment, by virtue of a particular state of charge of the energy store being prescribed that cannot be exceeded. In the case of a capacitor, that is to say that a maximum capacitor voltage $u_{max}$ is prescribed, for example, but cannot be exceeded. That is to say that as soon as the particular state of charge is reached, there is therefore particular provision for the transport of energy to the energy store to be terminated. That is to say that the energy store could still take energy, but is not allowed to on account of its thermal load.

According to another embodiment, the control device is configured to determine the thermal load based on a model using one or more variables associated with the at least one energy store, wherein the one or more variables comprise one or more elements from the following group of variables: a current load on the at least one energy store, an ambient temperature of the at least one energy store, a temperature of the at least one energy store, an internal resistance of the at least one energy store, a thermal resistance of the at least one energy store and a thermal time constant of the at least one energy store.

This achieves, for example, that the thermal load can be efficiently determined. The more the variables cited above are used for the model, the more accurately it is normally possible to determine the thermal load. Determination comprises particularly estimation.

According to another embodiment, the two-quadrant chopper, for a voltage conversion, comprises a coil for storing energy, wherein the control device is configured to vary a modulation index on the basis of a magnitude of the current flowing through the coil and on the basis of the thermal load on the at least one energy store, and wherein the control device is configured to operate the two-quadrant chopper using the modulation index.

This achieves, for example, that the variation of the modulation index can cause a voltage change that behaves precisely in the manner of a current-dependent voltage drop across a real resistor. Therefore, the variation of the modulation index inserts a virtual resistor that advantageously causes damping of the LC resonant circuit formed in the two-quadrant chopper without entailing the power losses that arise on a real electrical resistor.

The coil is therefore particularly part of the LC resonant circuit described above. For example, there is provision for the above-described variation of the modulation index to be performed for both coils of the LC resonant circuits of the two DC choppers. The statements made in connection with a coil apply analogously to multiple coils and vice versa.

That is to say particularly that both in one DC chopper, for example in the step-up converter, and in the other DC chopper, for example in the step-down converter, a respective above-described variation of the modulation index can be used to insert a respective virtual resistor.

That is to say particularly that the two-quadrant chopper, for a respective voltage conversion, comprises a respective coil for storing energy, wherein the control device is configured to vary a respective modulation index on the basis of a respective magnitude of the current flowing through the coil and on the basis of the thermal load on the at least one energy store, and wherein the control device is configured to operate the two-quadrant chopper using the respective modulation index.

The two coils are particularly each part of the two above-described LC resonant circuits of the two DC choppers. In one embodiment, more than two LC resonant circuits are provided. For example, three LC resonant circuits are provided.

In one embodiment, more than two DC choppers are provided. For example, three DC choppers are provided. That is to say particularly that the two-quadrant chopper comprises two or more than two, particularly three, DC choppers in one embodiment. Preferably, each DC chopper comprises an LC resonant circuit.

In one embodiment, when there are multiple LC resonant circuits, one, particularly precisely one, or more shared capacitors are provided. That is to say particularly that the multiple LC resonant circuits share one or more capacitors. One or more capacitors are thus particularly part of multiple LC resonant circuits.

A DC chopper is a step-up converter, for example. A DC chopper is a step-down converter, for example. Multiple DC choppers are in identical or different form, for example.

The provision of three LC resonant circuits or rather three DC choppers has the technical advantage, in particular, that a 3-phase converter can be formed that can efficiently actuate the electric motor.

The modulation index can also be referred to as a duty factor. The modulation index, particularly the modulation indices, will thus, according to one embodiment, be influenced on the basis of current such that the resultant voltage change behaves exactly in the manner of a current-dependent voltage drop across a real resistor.

The control of the two-quadrant chopper using the virtual resistor further allows parallel connection of multiple energy stores in an efficient manner to increase the power and/or a storage capacity. Therefore, according to one embodiment, some energy stores are connected in parallel. The current-dependent variation of the modulation index can be used to allow the virtual resistor to be used to split an input voltage into multiple, particularly two, output voltages.

A corresponding variation of the modulation index analogously allows two virtual resistors to be formed. To measure the current flowing through the coil, particularly through the coils, a measuring device is provided according to one embodiment.

According to one embodiment, a communication interface is provided that is configured to receive configuration data for the control device via a communication network and/or to send a status signal corresponding to a status of the at least one energy store via the communication network. This achieves, for example, that the control device can be configured remotely or rather that the status of the energy store can be made available remotely.

A status of the energy store comprises a state of charge and/or a temperature of the energy store, for example. For example, configuration data comprise a load threshold value, for example the first and/or second load threshold value, and/or an internal resistance of the at least one energy store and/or an ambient temperature of the at least one energy store and/or a thermal resistance of the at least one energy store and/or a thermal time constant of the at least one energy store.

Configuration data are thus particularly data based on which the control device can be configured in order to perform control of the current. The configuration data are thus used particularly for control.

The communication system comprises a bus system, for example. The communication system comprises an EtherCAT communication system, for example. For example, the communication interface is an EtherCAT communication interface.

According to another embodiment, the at least one energy store comprises one or more elements from the following group of energy stores: electrical energy store, particularly capacitor, particularly double-layer capacitor, particularly supercapacitor, particularly SuperCap, mechanical energy store, particularly kinematic energy store, particularly flywheel.

This achieves, for example, of efficient energy storage. Particularly capacitors have the advantage of direct energy storage, so that energy losses on account of conversion of energy for the purpose of storage can be avoided.

Mechanical energy stores, particularly flywheels, have the advantage of a short access time and a high number of cycles. In particular, mechanical energy stores afford the advantage of a greater energy density in comparison with electrolytic capacitors, for example.

According to another embodiment, a power supply connected to the converter is provided, wherein the control device is configured to control a first proportion of an energy needed for a motor mode of the electric motor, which proportion is provided by the power supply, and a second proportion of the energy needed for the motor mode of the electric motor, which proportion is provided by the at least one energy store, on the basis of the thermal load.

This achieves, for example, that a thermal overload on the energy store can be efficiently avoided. The control device thus controls both that proportion of the energy needed by the electric motor that the power supply is meant to make available, and that proportion of the energy needed by the electric motor that the at least one energy store is meant to make available, on the basis of the thermal load.

The power supply is of three-phase power supply, for example, and therefore uses a three-phase mains voltage, for example.

The text above and below describes embodiments that comprise a two-quadrant chopper. In further embodiments, multiple two-quadrant choppers are provided that are each in identical or different form, for example. That is to say that the energy store is supplied with energy by multiple two-quadrant choppers or rather that energy is taken from the energy store by multiple two-quadrant choppers. Therefore, the use of the singular for the two-quadrant chopper above and below is meant to include the plural. Statements made in connection with a two-quadrant chopper apply analogously to multiple two-quadrant choppers and vice versa.

In one embodiment, the apparatus for storing energy is configured or set up to carry out or perform the method for storing energy. Technical functionalities of the method are obtained analogously from corresponding technical functionalities of the apparatus and vice versa. Apparatus features are obtained particularly from corresponding method features and vice versa.

The wording "or rather" covers particularly the wording "and/or."

BRIEF DESCRIPTION OF THE DRAWINGS

The invention is explained in greater detail below on the basis of preferred exemplary embodiments with reference to figures, in which.

DETAILED DESCRIPTION

In the text below, like reference symbols can be used for like features.

Figure 1:
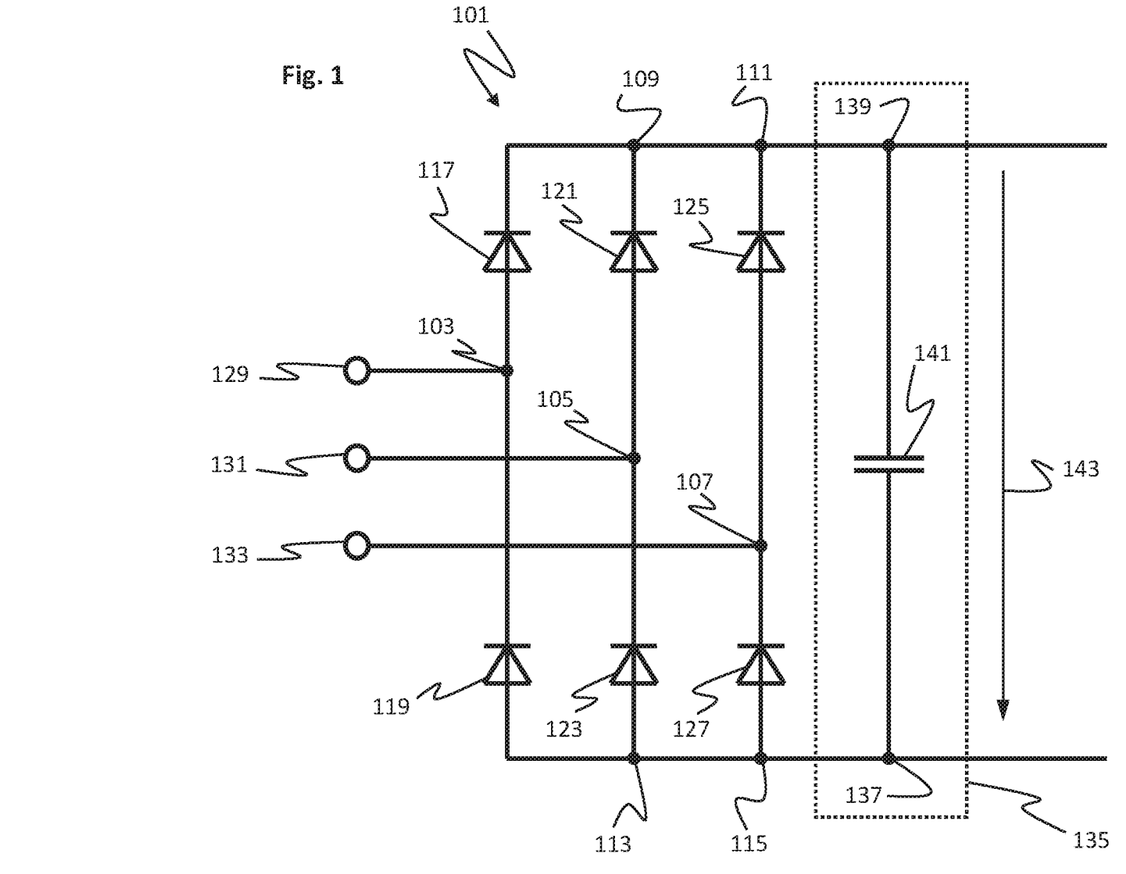
FIG. 1 shows a circuit arrangement for a rectifier.

FIG. 1 shows a circuit arrangement for a rectifier 101. The rectifier 101 further has a first circuit node 103, a second circuit node 105, a third circuit node 107, a fourth circuit node 109, a fifth circuit node 111, a sixth circuit node 113 and a seventh circuit node 115. The rectifier 101 has a first diode 117, a second diode 119, a third diode 121, a fourth diode 123, a fifth diode 125 and a sixth diode 127.

An anode of the first diode 117 is connected to the first circuit node 103. A cathode of the first diode 117 is connected to the fourth circuit node 109.

An anode of the second diode 119 is connected to the sixth circuit node 113. A cathode of the second diode 119 is connected to the first circuit node 103.

An anode of the third diode 121 is connected to the second circuit node 105. A cathode of the third diode 121 is connected to the fourth circuit node 109.

An anode of the fourth diode 123 is connected to the sixth circuit node 113. A cathode of the fourth diode 123 is connected to the second circuit node 105.

An anode of the fifth diode 125 is connected to the third circuit node 107. A cathode of the fifth diode 125 is connected to the fifth circuit node 111.

An anode of the sixth diode 127 is connected to the seventh circuit node 115. A cathode of the sixth diode 127 is connected to the third circuit node 107.

The first circuit node 103 is connected to a first phase 129 of a three-phase mains voltage, which is an AC voltage. The second circuit node 105 is connected to a second phase 131 of the three-phase mains voltage. The third circuit node 107 is connected to a third phase 133 of the three-phase mains voltage. The three-phase mains voltage is made available by a power supply, for example. The three-phase mains voltage is 400 $V_{AC}$, for example.

The rectifier 101 is connected to a DC link 135. The DC link 135 has an eighth circuit node 137 and a ninth circuit node 139. The eighth circuit node 137 is connected to the seventh circuit node 115. The ninth circuit node 139 is connected to the fifth circuit node 111.

The DC link 135 comprises a capacitor 141 that is arranged between the eighth circuit node 137 and the ninth circuit node 139. The capacitor 141 can also be referred to as a DC link capacitor.

The three-phase mains voltage is converted by the rectifier 101 into a DC voltage 143 that is applied between the eighth circuit node 137 and the ninth circuit node 139. The DC voltage 143 corresponds to the voltage applied across the DC link capacitor 141 and can therefore also be referred to as a DC link capacitor voltage. The DC voltage 143 is 600 $V_{DC}$, for example.

The DC voltage 143 can be reshaped again by an inverter into a three-phase AC voltage having an adjustable amplitude and an adjustable frequency, which is explained in more detail below with reference to FIG. 2.

Figure 2:
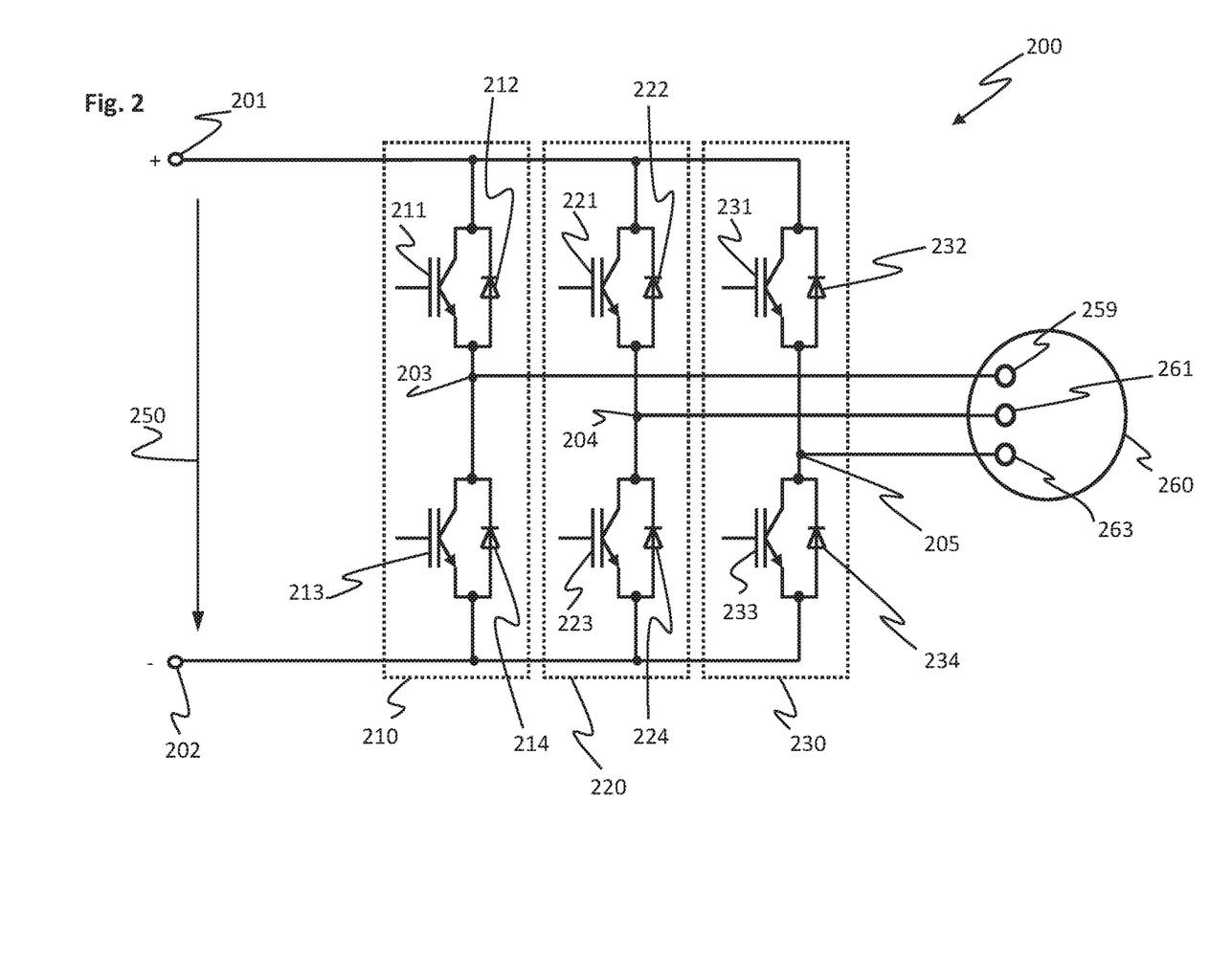
FIG. 2 shows a circuit arrangement for an inverter.

FIG. 2 shows a circuit arrangement for an inverter 200. The inverter 200 has a first circuit node 201, a second circuit node 202, a third circuit node 203, a fourth circuit node 204 and a fifth circuit node 205.

Further, the inverter 200 has a first half-bridge 210, a second half-bridge 220 and a third half-bridge 230. The first half-bridge 210 comprises a first transistor 211, a first diode 212, a second transistor 213 and a second diode 214. A collector of the first transistor 211 is connected to the first node 201. An emitter of the first transistor 211 is connected to the third node 203. A cathode of the first diode 212 is connected to the first node 201. An anode of the first diode 212 is connected to the third node 203. A collector of the second transistor 213 is connected to the third node 203. An emitter of the second transistor 213 is connected to the second node 202. A cathode of the second diode 214 is connected to the third node 203. An anode of the second diode 214 is connected to the second node 202.

The second half-bridge 220 comprises a third transistor 221, a third diode 222, a fourth transistor 223 and a fourth diode 224. A collector of the third transistor 221 is connected to the first node 201. An emitter of the third transistor 221 is connected to the fourth node 204. A cathode of the third diode 222 is connected to the first node 201. An anode of the third diode 222 is connected to the fourth node 204. A collector of the fourth transistor 223 is connected to the fourth node 204. An emitter of the fourth transistor 223 is connected to the second node 202. A cathode of the fourth diode 224 is connected to the fourth node 204. An anode of the fourth diode 224 is connected to the second node 202.

The third half-bridge 230 comprises a fifth transistor 231, a fifth diode 232, a sixth transistor 233 and a sixth diode 234. A collector of the fifth transistor 231 is connected to the first node 201. An emitter of the fifth transistor 231 is connected to the fifth node 205. A cathode of the fifth diode 232 is connected to the first node 201. An anode of the fifth diode 232 is connected to the fifth node 205. A collector of the sixth transistor 233 is connected to the fifth node 205. An emitter of the sixth transistor 233 is connected to the second node 202. A cathode of the sixth diode 234 is connected to the fifth node 205. An anode of the sixth diode 234 is connected to the second node 202.

The first node 201 of the inverter 200 is connected to the ninth circuit node 139 of the DC link 135. The second node 202 of the inverter 200 is connected to the eighth circuit node 137 of the DC link 135.

In parallel with the capacitor 141, the output voltage 143 of the rectifier 101 is thus applied between the first node 201 and the second node 202 of the inverter 200 as an input voltage 250. The input voltage 250 is therefore a DC voltage whose positive pole is applied to the first node 201 and whose negative pole is applied to the second node 202.

At the third node 203 of the inverter 200, it is possible to tap off a first phase 259 of a three-phase output voltage 260. At the fourth node 204 of the inverter 200, it is possible to tap off a second phase 261 of the three-phase output voltage 260. At the fifth node 205 of the inverter 200, it is possible to tap off a third phase 263 of the three-phase output voltage 260. The three-phase output voltage 260 is a three-phase AC voltage. The three-phase output voltage 260 can be used to supply power to an electric motor, for example.

During operation of the inverter 200, the transistors 211, 213, 221, 223, 231, 233 of the inverter 200 are actuated by pulse width modulation according to the principles of sinusoidal modulation or vector modulation that are known from the prior art in order to produce from the input voltage 250 the output voltage 260 with stipulatable amplitude and frequency. According to one embodiment, the transistors 211, 213, 221, 223, 231, 233 are in the form of insulated gate bipolar transistors (IGBT transistors). According to another embodiment, the transistors 211, 213, 221, 223, 231, 233 are in the form of MOSFET transistors.

Figure 3:
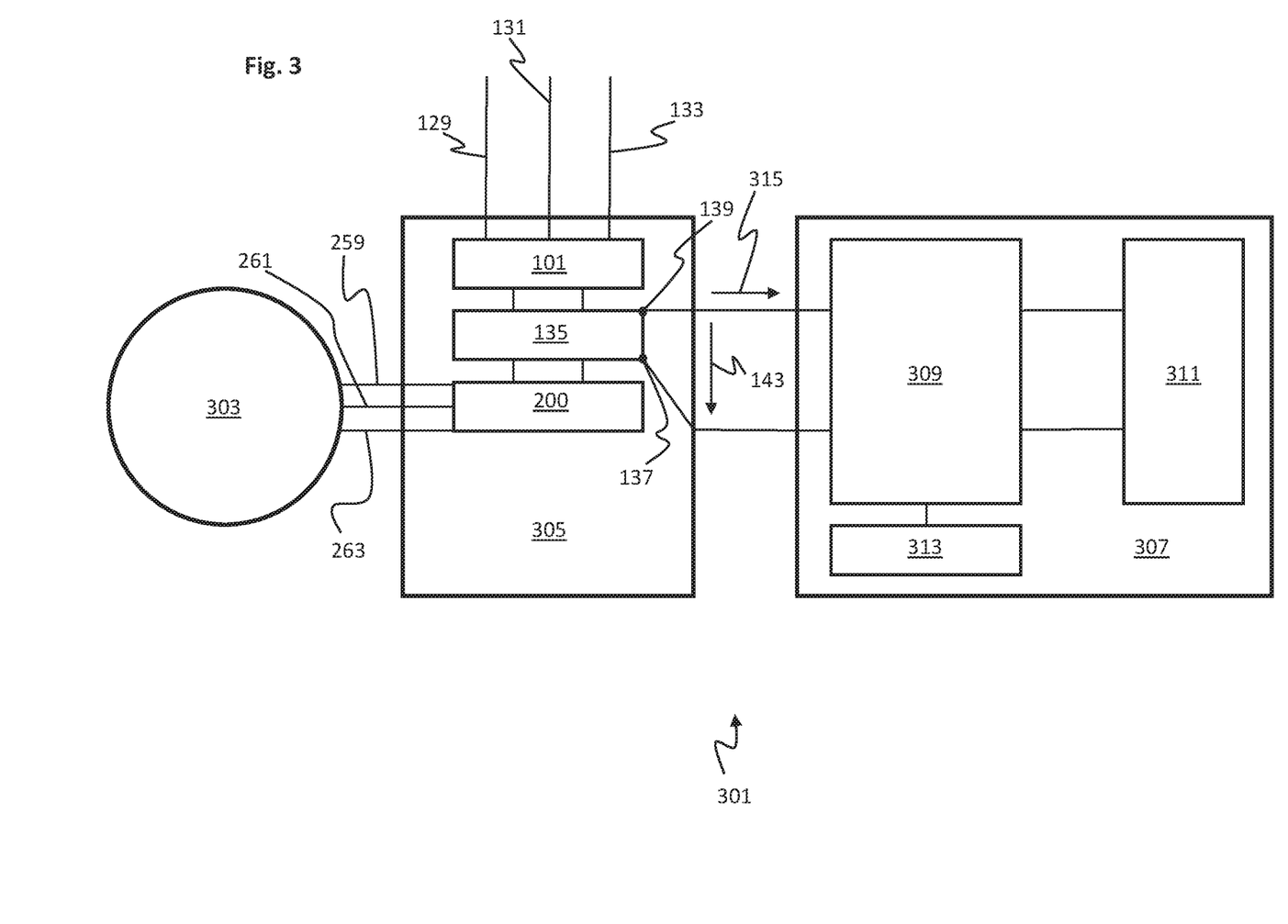
FIG. 3 shows a schematic block diagram of a drive system.

FIG. 3 shows a schematic block diagram of a drive system 301. The drive system 301 comprises an electric motor 303.

The drive system 301 further comprises a converter 305 and an apparatus 307 for storing energy. According to one embodiment, the apparatus 307 is also disclosed by itself.

The converter 305 is connected to the three phases 129, 131 and 133 of the three-phase mains voltage. The converter 305 comprises the rectifier 101 and the DC link 135 in accordance with the circuit arrangement shown in FIG. 1. Therefore, the rectifier 101 can convert the three-phase mains voltage into the DC voltage 143.

Further, the converter 305 comprises the inverter 200 in accordance with the circuit arrangement shown in FIG. 2. The inverter 200 is, as described above, connected to the DC link 135 and converts the DC voltage 143 into the three-phase output voltage 260. The three phases 259, 261, 263 of the output voltage 260 are connected to the electric motor 303, which means that the electric motor can be supplied with power by the three-phase output voltage 260.

Since the DC link 135 in the drive system 301 is comprised by the converter 305, the DC link 135 can also be referred to as a converter DC link. Accordingly, the DC link capacitor 141 can be referred to as a converter DC link capacitor.

The apparatus 307 comprises at least one two-quadrant chopper 309 that is connected to the eighth circuit node 137 and to the ninth circuit node 139. The two-quadrant chopper 309 is therefore connected to the converter DC link 135 of the converter 305. The DC link capacitor voltage 143 is therefore applied to the two-quadrant chopper 309 as an input voltage.

The apparatus 307 further comprises an energy store 311 that is connected to the two-quadrant chopper 309. This allows the two-quadrant chopper 309 to be able to be used to transport energy from the converter DC link 135 to the energy store 311 or vice versa.

The apparatus 307 further comprises a control device 313 for controlling a current 315 flowing in accordance with the transport of the energy. The control device 313 is configured to control the current 315 flowing in accordance with the transport on the basis of a thermal load on the energy store 311. In FIG. 3, the current arrow 315 points in the direction of the energy store 311. Energy thus flows from the DC link 135 to the energy store 311. Nevertheless, the arrow direction chosen in FIG. 3 is nonlimiting, but rather is merely intended to illustrate the case in which the energy store 311 is charged. The current arrow 315 points in the opposite direction when the energy store 311 is discharged, that is to say when energy is transported from the energy store 311 to the DC link 135.

As such, the electric motor 303 can be supplied with energy from the energy store 311 in order to operate the electric motor 303 in a motor or drive mode. Energy is thus transported from the energy store 311 by the two-quadrant chopper 309 to the converter DC link 135 and from the latter via the inverter 200 to the electric motor 303.

As such, the energy store 311 can store energy that is produced by the electric motor 303 in a generator mode, that is to say during braking, that is to say when the electric motor 303 is operated as a generative brake. This energy produced is transported via the inverter 200 to the converter DC link 135 and from the latter by the two-quadrant chopper 309 to the energy store 311.

The two-quadrant chopper 309 may comprise at least one step-up converter, by which energy can be transported from the energy store 311 to the converter DC link 135. The two-quadrant chopper 309 may comprise at least one step-down converter, by which energy can be transported from the converter DC link 135 to the energy store 311. Therefore, the apparatus 307 firstly has a USP (uninterruptible power supply) functionality: transport of energy from the energy source 311 to the electric motor 303, which is particularly advantageous when there is no three-phase mains voltage available, for example.

Secondly, the apparatus 307 has an energy store functionality: transport of energy from the electric motor 303 to the energy store 311, which is particularly advantageous when the electric motor 303 operates as a generator brake. The energy produced in this mode can therefore be supplied to the electric motor 303 again at a later time, allowing efficient operation of the electric motor 303.

In one embodiment, the energy store 311 comprises one or more supercapacitors or rather double layer capacitors. As a result, an energy density advantageously rises significantly. The supercapacitors of the Titan series manufactured by the Ioxus company from Oneonta, N.Y., USA can store over 10 000 Ws per $dm^3$, for example, and therefore require only approximately 5% of the space for storing the same energy in comparison with standard electrolytic capacitors.

In the case of supercapacitors, it makes sense to check an internal operating temperature (internal temperature). The reason is that an excessive operating temperature normally reduces the life of the supercapacitor.

An internal temperature $\theta_{SC}$ of a supercapacitor is based particularly on the following five parameters:
1. The rms current load $i_{rms}^2$ ("rms" stands for "root mean square"), that is to say a squared charging current or rather squared discharge current
2. The internal resistance $R_i$ of the supercapacitor
3. The ambient temperature $\theta_{Surroundings}$ of the supercapacitor
4. The thermal resistance $R_{th}$ of the supercapacitor
5. The thermal time constant $\tau_{th}$ of the supercapacitor The abbreviation "SC" standards for "supercapacitor." When the explanations below relate to the supercapacitor, they may generally also apply to capacitors per se, depending on embodiment.

Internal temperature is obtained approximately from:

$$\theta_{SC} \approx (i_{rms}^2 \times R_i) \times R_{th} + \theta_{Surroundings}$$

By way of example, it is additionally possible to take into consideration the thermal time constant $\tau_{th}$ as well, this not being included in the approximation above.

The physical relationship described above yields three aspects, in particular:
1. It makes sense, and one embodiment has provision, for a mode of the energy store 311 having a supercapacitor to be refined such that the rms current $(i_{rms})$ is at a minimum in order to reduce a thermal load on the energy store.
2. If the internal temperature of the supercapacitor becomes too high, one embodiment has provision for the energy store (the rms current) to be reduced.
3. Independently of an instantaneous operating temperature of the supercapacitor, one embodiment has provision for a USP functionality to be available.

The text below provides a more detailed explanation, by way of example, of use of the energy of a capacitor, for example of a supercapacitor, the capacitor being comprised by the energy store 311. It is noted that even if only the general term "capacitor" is used above and below, the more specific term "supercapacitor" may in some embodiments be inferred, and vice versa. As such, the abbreviation "SC" can be replaced by "C" for capacitor in some embodiments, and vice versa.

The energy stored in a capacitor is:

$$E_C = \frac{1}{2}Cu_C^2$$

The necessary current $i_C$ for charging or rather discharging is obtained from the desired power P and the voltage $u_C$.

$$i_C = \frac{P}{u_C}$$

If the capacitor of the energy store 311 is connected to the converter DC link 135 via the two-quadrant chopper 309, as shown schematically by the block diagram in FIG. 3, the step-up converter of the two-quadrant chopper 309 can be used to transport energy from the capacitor of the energy store 311 to the converter DC link 135. The step-down converter of the two-quadrant chopper 309 can be used to transport energy from the converter DC link 135 to the capacitor of the energy store 311. The voltage of the capacitor can become no higher than the voltage of the converter DC link 135, that is to say the voltage 143.

Additionally, care should be taken to ensure that the admissible voltage of the capacitor of the energy store 311 is not exceeded. Given a relatively small capacitor voltage, however, only little energy is stored in the capacitor and the current for storing or rather taking power becomes very high.

These limits yield a usable voltage range between $u_{minC}$ and $u_{maxC}$. This allows a large portion of the maximum energy storable in the capacitor to be used.

$$E_{Capacitor\_Usable} = \frac{1}{2}C(u_{maxC}^2 - u_{minC}^2)$$

If $$u_{minC} = \frac{u_{maxC}}{2}$$

is chosen, for which there is provision according to one embodiment, then 75% of the maximum energy storable in the capacitor can be used for buffer-storing energy.

Since the capacitor can also be used as a USP, it makes sense, and one embodiment has provision, for some of the energy $E_{Capacitor\_Usable}$ to be reserved for USP mode, for example 50% of the maximum energy storable in the capacitor.

When the electric motor 303 brakes electrically, the capacitor can take up to $u_{maxC}$ energy. This energy can be stored back to the DC link 135 again, so long as more usable energy is stored in the capacitor of the energy store 311 than there is provided or reserved for USP mode.

Figure 4:
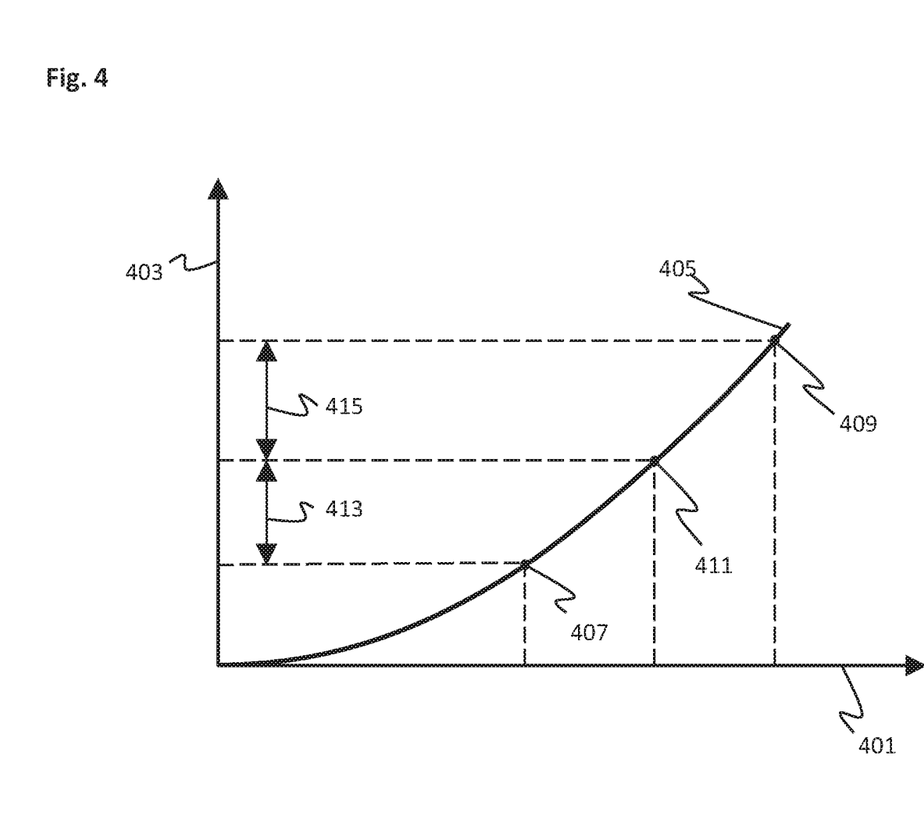
FIG. 4 shows a graphical dependency of an energy stored in a capacitor on a capacitor voltage.

The explanations above are graphically outlined in more detail by way of example of the graph shown in FIG. 4. The x axis is denoted by the reference symbol 401 and indicates the capacitor voltage $u_C$. The y axis is denoted by the reference symbol 403 and indicates the energy $E_{Capacitor}$ stored in the capacitor.

The reference symbol 405 points to a curve that shows the graphical profile of the dependency of $E_{Capacitor}$ on $u_C$. The reference symbol 407 points to a first point on the curve 405 with the x coordinate $u_{minC}$.

The reference symbol 409 points to a second point on the curve 405 with the x coordinate $u_{maxC}$. The y coordinate of the second point 409 has a 100% correspondence to the maximum energy storable in the capacitor. Further, $$u_{minC} = \frac{u_{maxC}}{2}.$$

The first point 407 outlines the lower limit of the usable voltage range described above. The second point 409 outlines the upper limit of the usable voltage range described above.

The reference symbol 411 points to a third point on the curve 405. The y coordinate of the third point 411 lies, for example centrally, between the y coordinate of the first point 407 and the y coordinate of the second point 409.

The reference symbol 413 points to a double-headed arrow that symbolically shows the range from the y coordinate of the first point 407 to the y coordinate of the third point 411. The reference symbol 415 symbolically points to a double-headed arrow that symbolically shows the range from the y coordinate of the third point 411 to the y coordinate of the second point 409.

The range 413 is reserved for USP mode. The range 415 can be used for buffer-storing energy in the capacitor of the energy store 311 when the electric motor 303 is operated as a generator.

That is to say that one embodiment has provision for it to be made certain that $E_{Capacitor}$ does not fall below the y coordinate of the third point 411. In general, it is thus particularly made certain that the energy store 311 may always be charged to 50%, for example. By way of example, there is provision for a state of charge of the capacitor to be measured, for example by measuring the voltage of the capacitor, the measurement being taken as a basis for controlling a discharge current. As soon as the state of charge reaches 50%, the discharge current is interrupted. The capacitor of the energy store 311 then supplies power to the electric motor 303 only in an emergency mode, that is to say should the three-phase mains voltage fail, for example.

Since, as explained above, the thermal load on a capacitor is dependent on $i_{rms}$, inter alia, it makes sense to minimize the latter. This minimization makes sense independently, in particular, and is provided for as such in one embodiment, of whether the energy store comprises a flywheel or a supercapacitor, for example.

If an acceleration or rather deceleration (braking) of the electric motor 303 is considered at a constant power and losses are ignored, then a square-wave power profile is obtained. During acceleration, a direct current $I_{DCacc}$ ("acc" stands for "acceleration") is taken from the DC link 135, and during deceleration, a direct current $I_{DCdec}$ ("dec" stands for "deceleration") is supplied for the DC link 135. Assuming that the DC link voltage is relatively constant, a square-wave profile for the current $I_{DC}$ is obtained.

At a DC link voltage 143 of $u_{ZK}$=600 $V_{DC}$ and a power of P=6 kW for accelerating or rather braking, $I_{DC}$=±10 $A_{DC}$ is taken or rather supplied in each case. If this current $I_{DC}$=±10 $A_{DC}$ is taken from or rather buffer-stored in the capacitor of the energy store 311, then the rms value $i_{rms}$ of this current is computed as follows:

$$i_{rms} = \sqrt{\frac{t_{acc} + t_{dec}}{T_{Cycle}}} \times I_{DC}$$

Given an acceleration time of $t_{acc}=1$ s and a deceleration time of $t_{dec}=1$ s and a cycle time of 10 s, an rms current of $i_{rms}=4.47$ A is obtained.

Provided that acceleration or rather braking takes place with a constant torque, an energy is transferred to/from the capacitor of the energy store 311 not with a square-wave current pulse but rather with a triangular-waveform current. The rms value is computed as follows:

$$i_{rms} = \sqrt{\frac{2 \times t_{acc} + 2 \times t_{dec}}{3 \times T_{Cycle}}} \times I_{DC}$$

The rms current $i_{rms}$ falls—given the same cycle time and power—in accordance with the factor $$\sqrt{\frac{2}{3}} \approx 0.816.$$

For example, shaping of the current pulse is brought about by virtue of the buffer-storage of the energy not taking place in square-wave form only when the ballast threshold is reached, but rather beginning with a ramp together with the start of the electrical braking process.

Furthermore, it is often not necessary for the energy for acceleration initially to be taken completely from the capacitor of the energy store 311 again. Instead, there is provision, for example, for half of the power needed (generally a first proportion of the energy needed) to be taken from the mains (in this case from the three-phase mains voltage, for example), the other half (generally a second proportion of the energy needed) being taken from the capacitor of the energy store 311.

A possible remainder of the energy stored in the capacitor of the energy store 311 can be taken from the energy store continuously, for example, in order to supply power to other devices connected to the DC link 135, for example.

In the example set out above, 10 A flow into the capacitor of the energy store 311 on braking. During acceleration, 5 A are taken from the capacitor of the energy store 311. In the remaining 8 seconds, $$\frac{5 \, As}{8 \, s} = 0.625 \, A$$

are taken from the capacitor of the energy store 311. This cycle yields an rms value of $i_{rms}=3.58$ A.

Figure 5:
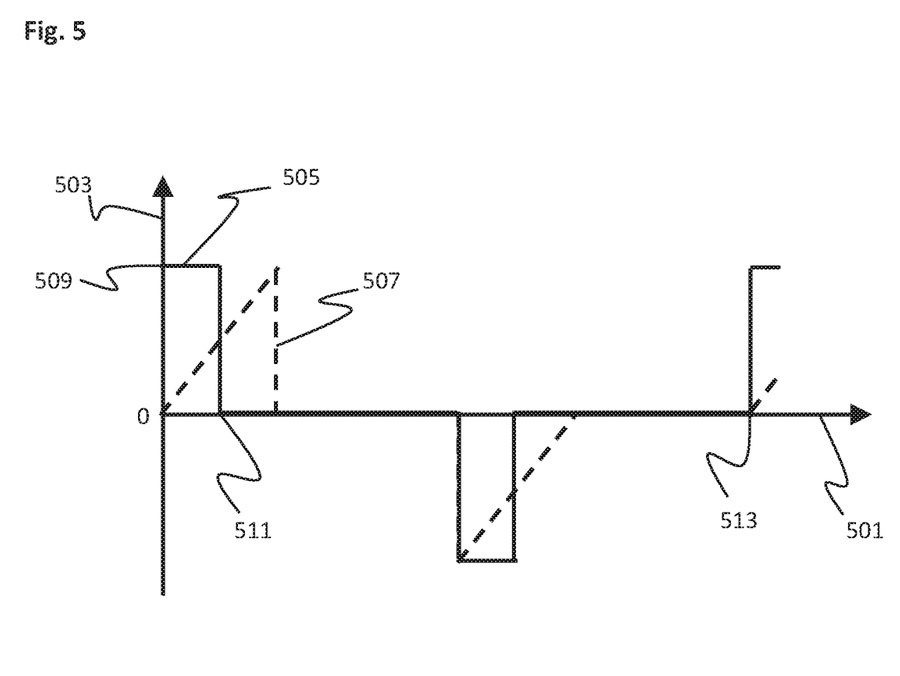
FIG. 5 shows a time profile for a square-wave current pulse and a triangular-waveform current pulse of a charging or rather discharge current during braking or rather deceleration of an electric motor.

FIG. 5 shows a time profile for a square-wave current pulse and a triangular-waveform current pulse of a charging or rather discharge current during braking or rather deceleration of the electric motor 303, as has been described above. The x axis is denoted by the reference symbol 501 and indicates the time in seconds. The y axis is denoted by the reference symbol 503 and indicates a charging current or rather discharge current $I_{DC}$ in A.

The reference symbol 505 denotes the square-wave current profile described above. The corresponding rms value is $i_{rms}=4.47$ A. The reference symbol 507 denotes the triangular-waveform current profile described above. The corresponding rms value is $i_{rms}=3.58$ A.

The reference symbol 509 points to a y coordinate with the value 10 A. The reference symbol 511 points to an x coordinate with the value 1 s. The reference symbol 513 points to an x coordinate with the value 10 s.

On the basis of relationship $P=i_{rms}^2 \times R$, heat losses due to current fall by approximately $$36\% \left(\frac{3.58^2}{4.47^2}\right).$$

Such an energy-optimized behavior can be achieved according to one embodiment using two virtual resistors and a virtual voltage source. That is to say that one embodiment has provision for the two-quadrant chopper to have two virtual resistors (a virtual resistor for each of the step-up converter and the step-down converter) and a virtual voltage source, this being explained in more detail below with reference to the equivalent circuit shown in FIG. 6.

Figure 6:
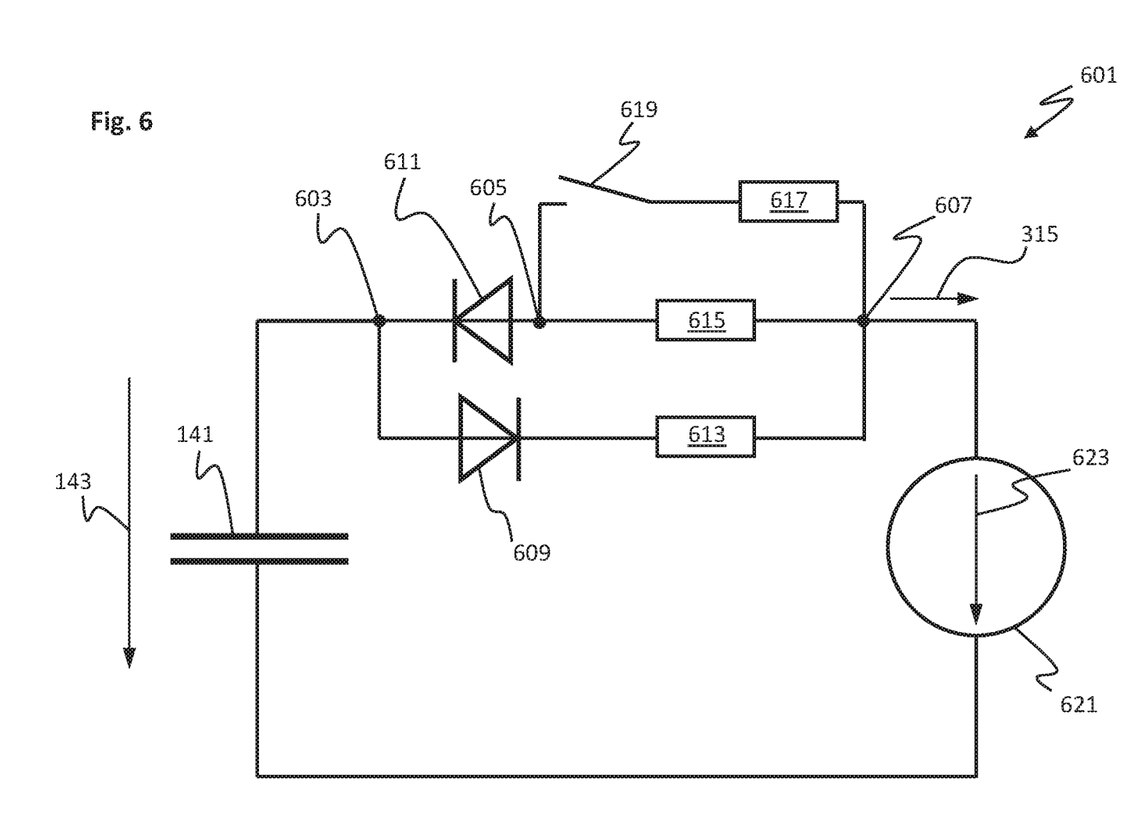
FIG. 6 shows an equivalent circuit.

The current that flows to or rather away from the capacitor of the energy store 311 is obtained from the equivalent circuit 601 with virtual components that are shown in FIG. 6, for example. The equivalent circuit 601 may comprise the DC link capacitor 141, across which the DC link capacitor voltage 143 $u_{ZK}$ is applied. The equivalent circuit 601 may further comprise a first circuit node 603, a second circuit node 605 and a third circuit node 607.

The equivalent circuit 601 comprises a first diode 609 and a second diode 611. The equivalent circuit 601 comprises a first virtual resistor 613, a second virtual resistor 615 and a third virtual resistor 617. The equivalent circuit 601 furthermore comprises a switch 619 and a virtual voltage source 621 that provides a virtual voltage 623 $u_V$.

An anode of the first diode 609 is connected to the first circuit node 603. A cathode of the first diode 609 is connected to the third circuit node 607. The cathode of the first diode 609 and the third circuit node have the first virtual resistor 613 connected between them.

A cathode of the second diode 611 is connected to the first circuit node 603. An anode of the second diode 611 is connected to the second circuit node 605. The second virtual resistor 615 is connected between the second circuit node 605 and the third circuit node 607.

In parallel with the second virtual resistor 615, the switch 619 and a third virtual resistor 617 are connected in series between the second circuit node 605 and the third circuit node 607. The switch 619 is connected to the second circuit node 605 and a third virtual resistor 617. The third virtual resistor 617 is connected to the switch 619 and to the third circuit node 607. The switch 619 can be closed in a USP mode, for example, so that the current flowing can be increased, that is to say so that a transport of energy from the capacitor of the buffer store 311 to the electric motor 303 can be increased.

The third virtual resistor 617 can be formed, for example, analogously to the first virtual resistor 613 and the second virtual resistor 615, by appropriate variation of a modulation index. The relevant statements made are referenced to avoid repetition.

In parallel with the series connection comprising the first diode 609 and the first virtual resistor 613, the DC link capacitor 141 and the virtual voltage source 621 are connected in series between the first circuit node 603 and the third circuit node 607. The DC link capacitor 141 is connected to the first circuit node 603 and to the virtual voltage source 623. The virtual voltage source 623 is connected to the DC link capacitor 141 and to the third circuit node 607.

The first virtual resistor 613 $R_{dec}$ determines the current 315 that flows from the DC link capacitor 141 in the direction of the capacitor of the energy store 311 (electrical braking) so long as the capacitor of the energy store 311 can take energy, that is to say so long as $u_C < u_{maxC}$.

The second virtual resistor 615 $R_{acc}$ determines the current 315 that flows from the capacitor of the energy store 311 in the direction of the DC link capacitor 141 (motor mode) so long as the capacitor of the energy store 311 can deliver energy, that is to say so long as energy is stored in the USP range 413.

The virtual voltage 623 $u_V$ is computed linearly from two parameters and the instantaneous ("actual," hence abbreviated to "act" below) state of charge $E_{act}$ of the capacitor of the energy store 311:

$$u_V = u_1 + \frac{E_{act}}{E_{max}} \times u_2$$

where $E_{max}$ corresponds to the $E_{Capacitor\_usable}$ defined above.

The quotient $$\frac{E_{act}}{E_{max}}$$

can assume values between 0, corresponding to the y coordinate of the third point 411 shown in FIG. 4, and 1, corresponding to the y coordinate of the second point 409 shown in FIG. 4. That is to say that the charge $E_{act}$ stored in in the capacitor of the energy store 311 is converted into a virtual voltage $u_V$.

When $u_1=600$ V, for example, and $u_2=50$ V, for example, the virtual voltage $u_V=600$ V for the capacitor of the energy store 311, which stores a quantity of energy that corresponds to the y coordinate of the first point 407 shown in FIG. 4, and $u_V=650$ V when the capacitor is charged to the maximum (second point 409 shown in FIG. 4).

The current 315 is computed as follows:

Case 1: $u_{ZK} > u_V$, then $$I_{DC} = \frac{u_{ZK} - u_V}{R_{acc}}$$

so long as the capacitor of the energy store 311 can take energy.

Case 2: $u_{ZK} < u_V$, then $$I_{DC} = \frac{u_{ZK} - u_V}{R_{dec}}$$

so long as the capacitor of the energy store 311 can deliver energy.

Case 3: USP mode: in the event of failure of the three-phase mains voltage, one embodiment has provision for energy for the USP functionality to be transferred to the DC link capacitor 141 (switch 619 becomes or rather is closed) independently of the thermal load on the capacitor of the energy store 311.

That is to say that generally one embodiment has provision for the electric motor 303 to be supplied with energy by the energy store 311 independently of the thermal load thereon in the event of failure of a three-phase mains voltage.

One embodiment has provision for the virtual resistors 613, 615 to be varied on the basis of a thermal load on or rather of an operating temperature of the capacitor of the energy store 311:

$$R_{acc} = R_{acc0} \times (1 + \alpha_{acc}(\theta_{SC} - \theta_0))$$

and $$R_{dec} = R_{dec0} \times (1 + \alpha_{dec}(\theta_{SC} - \theta_0))$$

where $\alpha_{acc}$ and $\alpha_{dec}$ are temperature coefficients.

For positive temperature coefficients ($\alpha_{acc} > 0$ and/or $\alpha_{dec} > 0$), the current 315 is automatically reduced as the operating temperature (measured or estimated) rises. This has the following advantages, in particular:

Since the DC link voltage 143 does not rise abruptly, the current 315 $I_{DC}$ also does not rise abruptly. This lowers the rms value $i_{rms}$ of the current 315.

The parameterization of the two virtual resistors $R_{dec}$ and $R_{acc}$ can be used to specifically reduce the current 315 by increasing $R_{acc}$ for acceleration or rather by increasing $R_{dec}$ for deceleration.

As explained above, the virtual resistors are produced or formed, that is to say inserted into the step-up converter or rather into the step-down converter, by a variation of a modulation index, for example. The variation is performed on the basis of a thermal load on the capacitor and on the basis of a magnitude of the current flowing through the respective coil of the step-up converter or rather step-down converter, that is to say on a temperature and current basis.

If the energy store 311 has multiple capacitors, then these are connected in parallel, for example, the virtual voltage source 621 being able to be used to automatically split the stored energy evenly over the capacitors. If multiple capacitors of the energy store 311 are connected in parallel, a temperature-dependent virtual resistor $R_{dec}$ can split the current 315 evenly over capacitors.

The optimization of the rms value $I_{rms}$ advantageously has no influence on the USP functionality. The provision of the virtual resistors 613, 615 and 617 further has the advantage that the current 315 to the capacitor of the energy store 311 is limited and smoothed.

In one embodiment, a DC machine power supply is provided for supplying power to the electric motor 303. The DC machine power supply has a "hot plug" functionality, for example.

In one embodiment, a two-quadrant chopper comprises one or more supercapacitors, particularly SuperCaps. That is to say particularly that a step-up converter and a step-down converter of the two-quadrant chopper each have an LC resonant circuit, the capacitance being formed by a supercapacitor.

According to one embodiment, the at least one energy store is connected to the converter DC link by multiple parallel-connected two-quadrant choppers, having phase-shifted clocking, and a 3-phase inductor.

In one embodiment, the internal resistance of the supercapacitor, particularly of the SuperCap, is measured. The measured internal resistance is used for the model in order to determine the thermal load on the supercapacitor. Further, there is provision, for example, for the measured internal resistance to be taken as a basis for estimating a remaining use time for the supercapacitor.

Energy that can no longer be stored in the energy store on account of the thermal load on the latter is fed back to a power supply system and/or dissipated as heat via a ballast resistor, for example.

Figure 7:
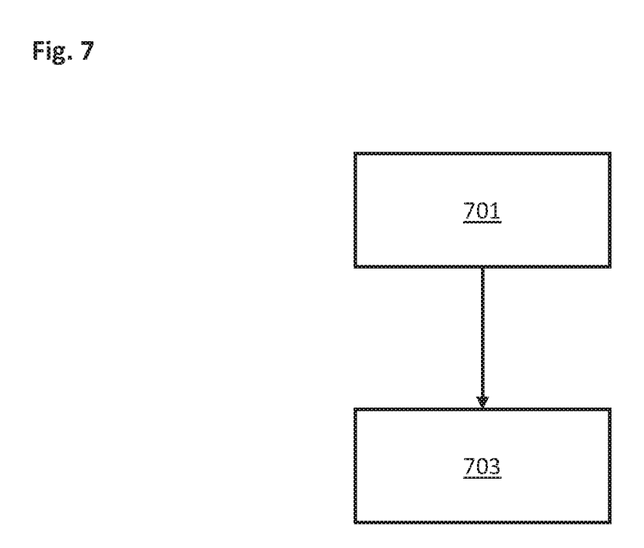
FIG. 7 shows a flowchart for a method for storing energy.

FIG. 7 shows a flowchart for a method for storing energy using the apparatus 307, wherein the two-quadrant chopper 309 is connected to the converter DC link 135. The method comprises the following steps:

transporting 701 energy from the converter DC link 135 to the at least one energy store 311 or vice versa by the two-quadrant chopper 309, so that a current 315 flows in accordance with the transport of the energy, and controlling 703 the current 315 flowing in accordance with the transport of the energy by the control device 313 on the basis of a thermal load on the at least one energy store 311.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. An apparatus for storing energy, comprising: a two-quadrant chopper, at least one energy store, connected to the two-quadrant chopper, the two-quadrant chopper being used to transport energy to and from the at least one energy store or vice versa, wherein the at least one energy store comprises one or more elements selected from the following group of energy stores: double-layer capacitor, supercapacitor or SuperCap, and kinematic energy store or flywheel, a control device for controlling a current flowing in accordance with the transport of the energy, the control device controlling the current flowing in accordance with the transport on the basis of a thermal load on the at least one energy store, wherein the thermal load is based on a product of the current flowing, squared and a time interval being dependent on an associated thermal time constant of the energy store, the thermal time constant being obtained from a power dissipation and a thermal mass of the energy store; and wherein the current flowing, squared is controlled at a minimum taking into consideration the thermal time constant in order to reduce the thermal load on the energy store, wherein a control operation includes a shaping of a current pulse having a ramp.

2. The apparatus according to claim 1, wherein the control device is configured to reduce a current flowing to and from the at least one energy store in the event of the thermal load exceeding a predetermined first load threshold value.

3. The apparatus according to claim 1, wherein the control device is configured to interrupt a current flowing to and from the at least one energy store or vice versa in the event of the thermal load exceeding a predetermined first load threshold value.

4. The apparatus according to claim 1, wherein the control device is configured to reduce an energy storable in the at least one energy store in the event of the thermal load exceeding a predetermined second load threshold value.

5. The apparatus according to claim 1, wherein the control device is configured to determine the thermal load based on a model using one or more variables associated with the at least one energy store, wherein the one or more variables comprise one or more elements from the following group of variables: a current load on the at least one energy store, an ambient temperature of the at least one energy store, a temperature of the at least one energy store, an internal resistance of the at least one energy store, a thermal resistance of the at least one energy store and a thermal time constant of the at least one energy store.

6. The apparatus to claim 1, wherein the two-quadrant chopper, for a voltage conversion, comprises a coil for storing energy, wherein the control device is configured to vary a modulation index on the basis of a magnitude of the current flowing through the coil and on the basis of the thermal load on the at least one energy store, and wherein the control device is configured to operate the two-quadrant chopper using the modulation index.

7. The apparatus to claim 1, wherein a communication interface is provided that is configured to receive configuration data for the control device via a communication network.

8. The apparatus to claim 1, wherein a communication interface is provided that is configured to send a status signal corresponding to a status of the at least one energy store via a communication network.

9. A drive system comprising:
an electric motor connected to a converter having a converter DC link,
a power supply connected to the converter, wherein the power supply uses a three-phase mains voltage,
a two-quadrant chopper connected to the converter DC link,
at least one energy store, connected to the two-quadrant chopper, for storing energy, the energy store having a lower first energy range and an upper second energy range, the lower first energy range exclusively reserved for a USP mode and the upper second energy range being used for buffer-storing energy,
the two-quadrant chopper being used to transport energy from the converter DC link to the at least one energy store or vice versa, the energy exchange excluding the lower first energy range of the energy store,
a control device for controlling a current flowing in accordance with the transport of the energy, the control device being configured to control the current flowing in accordance with the transport on the basis of a thermal load on the at least one energy store,
wherein in the event of failure of the three-phase mains voltage of the power supply, energy from the energy store is transferred to the DC link independently of the thermal load of the energy store including the lower first energy range of the energy store.

10. The drive system according to claim 9, wherein the control device is configured to control a first proportion of an energy needed for a motor mode of the electric motor, which proportion is provided by the power supply, and a second proportion of the energy needed for the motor mode of the electric motor, which proportion is provided by the at least one energy store, on the basis of the thermal load.

11. The drive system according to claim 9, wherein the control device is configured to reduce and/or interrupt a current flowing from the converter DC link to the at least one energy store or vice versa in the event of the thermal load exceeding a predetermined first load threshold value.

12. The drive system according to claim 9, wherein the control device is configured to reduce an energy storable in the at least one energy store in the event of the thermal load exceeding a predetermined second load threshold value.

13. The drive system according to claim 9, wherein the control device is configured to determine the thermal load based on a model using one or more variables associated with the at least one energy store, wherein the one or more variables comprise one or more elements from the following group of variables: a current load on the at least one energy store, an ambient temperature of the at least one energy store, a temperature of the at least one energy store, an internal resistance of the at least one energy store, a thermal resistance of the at least one energy store and a thermal time constant of the at least one energy store.

14. The drive system according to claim 9, wherein the two-quadrant chopper, for a voltage conversion, comprises a coil for storing energy, wherein the control device is configured to vary a modulation index on the basis of a magnitude of the current flowing through the coil and on the basis of the thermal load on the at least one energy store, and wherein the control device is configured to operate the two-quadrant chopper using the modulation index.

15. The method according to claim 9, wherein the control device reduces an energy storable in the at least one energy store in the event of the thermal load exceeding a predetermined second load threshold value.

16. The method according to claim 9, wherein the control device determines the thermal load based on a model using one or more variables associated with the at least one energy store, wherein the one or more variables comprise one or more elements from the following group of variables: a current load on the at least one energy store, an ambient temperature of the at least one energy store, a temperature of the at least one energy store, an internal resistance of the at least one energy store, a thermal resistance of the at least one energy store and a thermal time constant of the at least one energy store.

17. The method according to claim 9, wherein the two-quadrant chopper, for a voltage conversion, comprises a coil for storing energy, wherein the control device varies a modulation index on the basis of a magnitude of the current flowing through the coil and on the basis of the thermal load on the at least one energy store, and wherein the control device is configured to operate the two-quadrant chopper using the modulation index.

18. The method according to claim 9, wherein a communication interface receives configuration data for the control device via a communication network.

19. The method according to claim 9, wherein a communication interface sends a status signal corresponding to a status of the at least one energy store via a communication network.

20. A method for storing energy using an apparatus,
wherein a two-quadrant chopper is connected to a converter DC link,
wherein the two-quadrant chopper is further connected to at least one energy store for storing energy, the energy store having a lower first energy range being exclusively reserved for a USP mode and an upper second energy range being used for buffer-storing energy, comprising the following steps:
transporting energy from the converter DC link to the energy store or vice versa by the two-quadrant chopper, so that a current flows in accordance with the transport of the energy, and
controlling the current flowing in accordance with the transport of the energy by a control device on the basis of a thermal load on the at least one energy store wherein the thermal load is based on the current flowing,
wherein a state of charge of the energy store is measured, the measurement being taken as a basis for controlling a discharge current so that as soon as the state of charge reaches a predetermined percentage being an upper limit of the lower first energy range of the energy store, the discharge current is interrupted.

21. The method according to claim 20, wherein the control device reduces a current flowing from the converter DC link to the at least one energy store or vice versa in the event of the thermal load exceeding a predetermined first load threshold value.

22. The method according to claim 20, wherein the control device interrupts a current flowing from the converter DC link to the at least one energy store or vice versa in the event of the thermal load exceeding a predetermined first load threshold value.

* * * * *